(12) United States Patent
Nelson

(10) Patent No.: US 6,556,690 B1
(45) Date of Patent: Apr. 29, 2003

(54) ARTICLES BEARING INVISIBLE ENCODEMENTS ON CURVED SURFACES

(75) Inventor: David J. Nelson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/335,417

(22) Filed: Jun. 17, 1999

(51) Int. Cl.[7] .................................................. G06K 9/00
(52) U.S. Cl. ....................................... 382/100; 235/468
(58) Field of Search .......................... 382/10, 266, 202, 382/299; 235/494, 462.14, 468.1, 462.27, 462.41, 454, 462.07, 462.06; 359/199

(56) References Cited

U.S. PATENT DOCUMENTS

| | | |
|---|---|---|
| 5,059,126 A | 10/1991 | Kimball |
| 5,109,153 A | 4/1992 | Johnson et al. |
| 5,276,472 A | 1/1994 | Bell et al. |
| 5,313,235 A | 5/1994 | Inoue et al. |
| 5,314,336 A | 5/1994 | Diamond et al. |
| 5,478,997 A | 12/1995 | Bridgelall et al. |
| 5,583,331 A * | 12/1996 | Dvorkis ...................... 235/462 |
| 5,591,956 A | 1/1997 | Longacre, Jr. |
| 5,635,699 A * | 6/1997 | Cherry et al. ................ 235/462 |
| 5,854,478 A | 12/1998 | Liu et al. |
| 5,936,224 A * | 8/1999 | Shimizu et al. ........... 235/462.1 |
| 6,088,482 A * | 7/2000 | He et al. .................... 382/202 |

FOREIGN PATENT DOCUMENTS

EP          0 643 364 A2      3/1995

* cited by examiner

*Primary Examiner*—Jayanti K. Patel
*Assistant Examiner*—Seyed Azarian
(74) *Attorney, Agent, or Firm*—Robert Luke Walker

(57) ABSTRACT

An object bearing a two-dimensional visible image on an image field of a non-planar and curved object surface in at least one dimension also bears an encodement of encoded information recorded in a symbology of a material that is visible or invisible to the eye and over a substantial portion of the image field. The encodement includes curved encodement portions due to the curvature of the non-planar image field. The symbology of the encodement is adapted to be imaged as a planar symbology image by a planar imager that is disposed in use generally normal to and at a predetermined distance from a central point of the two-dimensional visible image. The recorded symbology is adjusted from point to point in the image field during recording of the encodement by an encodement recording system to compensate for distortion of the symbology introduced by imaging the curved symbology portions as the planar symbology image. In an encodement reader system, the encodement is captured by the planar imager and decoded and then reproduced as data or sound or visual information.

35 Claims, 8 Drawing Sheets

ARTICLES BEARING INVISIBLE ENCODEMENTS ON CURVED SURFACES

CROSS REFERENCE TO RELATED APPLICATIONS

Reference is made to commonly assigned co-pending U.S. patent applications: Ser. No. 09/122,502 filed Jul. 24, 1998, entitled: DATA READER AND READER SYSTEM HAVING VISIBLE CENTERLESS TARGETING, and filed in the names of David J. Nelson, Robert C. Bryant, Carl F. Leidig; Ser. No. 09/121,907, filed Jul. 24, 1998, entitled: ANGLED TARGETING DATA READER AND READING SYSTEM, and filed in the names of Carl F. Leidig, David J. Nelson, Robert C. Bryant; Ser. No. 09/223,859 filed Dec. 31, 1998, entitled: ARTICLE AND METHOD FOR STORAGE OF DATA, and filed in the names of Kevin W. Williams and Huyuan D. Chen; Ser. No. 08/931,575 filed Sep. 16, 1997, entitled: METHOD AND APPARATUS FOR PRODUCING IMAGE PRINTS WITH VARIABLE DATA ENCODEMENT, and filed in the names of Peter P. Soscia, Jeffrey Alan Small, Thomas C. Reiter; Ser. No. 08/959,036 filed Oct. 28, 1997, entitled: SYSTEM AND PROCESS FOR NON-PERCEPTIBLY INTEGRATING SOUND DATA INTO A PRINTED IMAGE, and filed in the name of Peter P. Soscia; and Ser. No. 09/128,881 filed Aug. 4, 1998, entitled: METHOD OF PULSING LIGHT EMITTING DIODES FOR READING FLUORESCENT INDICIA, DATA READER, AND SYSTEM, and filed in the names of Thomas M. Stephany, Bryan D. Bernardi, Robert C. Bryant, David J. Nelson.

FIELD OF THE INVENTION

The invention relates to objects bearing visible images on curved image field surfaces along with an encodement that may be associated with the visible image and can be captured, decoded and reproduced as data, aural and/or visual information and methods of producing the same, and particularly to such encodements as are invisible to the human eye under normal light conditions.

BACKGROUND OF THE INVENTION

It is well known to imprint data on various articles and objects, including printed media, labels, containers, vehicles, etc., in the form of a machine readable, code or "symbology" that is visible to the eye but requires a reader to read and decode. The terms "symbology" or "symbologies" are generally employed to denote spatial patterns of symbology elements or marks, wherein each mark has a shape and separated from an adjacent mark by a spacing between the marks, whereby information is encoded in the shapes and/or the spacings between the marks, and embrace bar codes and other codes as described further below. Typically the decoded information output by the reader is used by a machine in a process of identification of the article and to associate it with other data, e.g. unit price and restocking code, which may be displayed and printed out. A great many symbologies and specialized symbology readers have been adopted over the years for encoding data. A history of one-dimensional and two-dimensional bar codes and readers that have been adopted and standardized is set forth in U.S. Pat. Nos. 5,591,956; 5,583,331; and 5,854,478, all incorporated herein by reference.

It is also known to encode aural information as such machine readable bar codes associated with images on media so that aural information or sound can be reproduced from the encoded symbology. Such systems are shown, for example, in U.S. Pat. Nos. 5,276,472 and 5,313,235 in relation to photographic prints, and in U.S. Pat. Nos. 5,059,126 and 5,314,336 in relation to other objects or printed images.

Typically such symbologies, e.g. bar codes, are intended to be printed onto a planar surface and read either by a linear scanner or a two-dimensional linear scanner or a planar imager, e.g., a CCD or CMOS array imager. However, it is also known to print visible bar codes on curved surfaces, wherein the bar codes are read by scanners. Typically, only simple, low data content, bar codes are printed on known curved surfaces to avoid using too much space on the object or media and to present the small area bar code in a more linear image field to ease reading it with a simple bar code scanner. For example, soft drink cans are imprinted with product identification bar codes that extend in parallel with the axis of the can. Such bar codes are read out by generally aligning the bar code with the linear scanner so that the line portion of the bar code that is scanned lies in a plane. In this case, it is necessary to align the bar code to the linear scanner when the bar code is scanned. In other cases, only a very short bar code is imprinted on a curved image field that has a relatively large radius of curvature, so that the image of the bar code is relatively linear to the scanner.

Additionally, a number of other approaches have been undertaken to be able to accurately read bar codes that are printed upon a container or a flexible label such that it is inherently in a curved field as described in the above-incorporated '331 patent, for example. The curvature is typically compensated for using software for processing the scanned symbology element data and/or optical mirror systems for oscillating the scanning beam to compensate for the curvature as described therein.

The above-referenced, commonly assigned and pending patent applications disclose recording "variable data" as an invisible "encodement" located in an image field on media on a photographic print image or a print that is produced by other means and reproducing the encodement as aural or sound information. The term "variable data" includes data that varies from print to print and contains information related to the visible print image. The "encodement" is preferably formed of a two-dimensional symbology that is relatively dense and is at least co-extensive in area with the visible photographic image to maximize the amount of sound information that can be recorded. The encodement is invisible or substantially invisible to the human eye when viewed under normal viewing conditions, that is, facing the viewer and under sunlight or normal room illumination such as incandescent lighting.

The above-referenced application Ser. No. 08/931,575, incorporated herein by reference, discloses systems for recording and reading of encodements of this type. The invisible encodement image is illuminated and the illuminated image is captured by a planar imager, e.g. a CCD array imager, and decoded and played back as sound through various sound reproduction systems. During reading, in order to image the encodement and capture and decode the symbology accurately, it is necessary to locate the planar imager parallel with the image field and generally in alignment with a central point of the image field or visible print. Otherwise, part of the encodement will not be imaged by the planar imager and/or the symbology will be distorted if the image field plane is skewed to the plane of the planar imager. The above-referenced U.S. patent application Ser. Nos. 09/122,502, and 09/121,907, which are both hereby incorporated herein by reference, set forth systems and methods for assisting the user of a hand held planar imager in achieving the optimal alignment with a relatively planar image field.

In the above-described systems and methods, it is assumed that the media or surface on which the visible image and the invisible encodement are printed or otherwise formed within the image field is flat or planar. Moreover, the encodement is generally specified to constitute any of the known symbologies that have been devised or may be devised in the future that are intended to be printed upon such a planar surface, preferably such two-dimensional symbologies that are capable of high density data storage.

Not all print images and image planes are necessarily planar. It would be desirable to provide a simple and easily implemented manner implementing such encodement technology in non-planar image fields on media or surfaces of various types using a simple scanner or reader capable of reading encodements printed on both curved and flat image fields.

SUMMARY OF THE INVENTION

The invention is defined by the claims. The invention, in its broader aspects, provides objects that have or present in use non-planar media or surfaces with image fields that are curved at least in part and contain recorded encodements and visible images. In accordance with the invention, the recorded symbology constituting the encodement is modified to compensate for distortion of the symbology introduced by imaging the curved symbology portions as planar symbology image portions. The compensation or adjustment of the symbology ensures that the encoded information is accurately captured by the scanner and read, decoded and reproduced as data, sound, or visual information. The invention also involves methods of modifying the symbology in the curved symbology portions of the encodement to compensate for the distortion that is occasioned by imaging the curved symbology portions in the planar symbology image.

In certain preferred embodiments of the invention, the symbology is invisible or substantially invisible to the human eye when viewed under normal viewing conditions and is recorded over a visible image in the image field. Additionally, the objects on which the image fields are printed or recorded are preferably curved in one direction or in two directions, and may comprise cylindrical objects, spherical objects and print media that is curved at least in part when viewed. A great deal of data can be encoded into such invisible encodements extending over the full, visible image without obscuring or degrading it.

It is an advantageous effect of at least some of the embodiments of the invention that variable data encodement can be undertaken with respect to image fields on curved surfaces and that these encodements can be captured and accurately decoded using a simple, hand held, planar imager. The curved surfaces include magazine or book pages that are curved at least in part when a page is exposed for view, due to the binding of the book or magazine. Similarly, the variable data encodement can be undertaken for image fields that are even more or less curved, e.g., cylindrical surfaces or spherical surfaces.

BRIEF DESCRIPTION OF THE DRAWINGS

The above-mentioned and other features and advantages of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
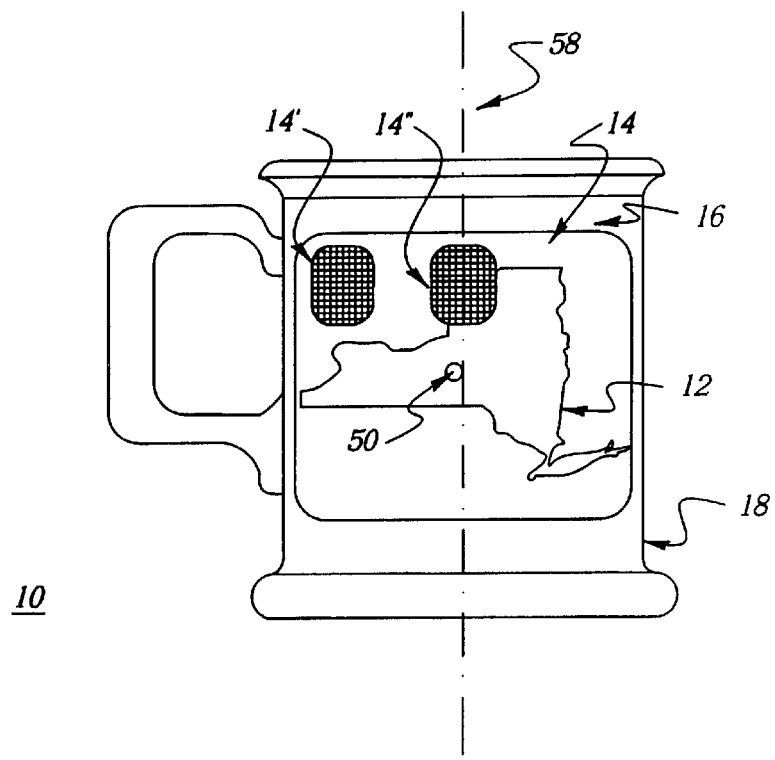
FIG. 1 is a side elevation schematic view of a cylindrical object, e.g., a coffee mug, that bears a visible image and invisible encodement recording sound information on its cylindrical outer surface in accordance with one embodiment of the invention.

The present invention can be implemented in many embodiments and is particularly useful where it is desired to record a large volume of data in a given image field of an object having a known curvature in one or two directions that is to be imaged by or projected onto a planar imager. The known curvature can be permanently fixed by the shape of the object or can be the result of a presentation of the object to the planar imager for reading. In accordance with the invention, correction factors for the curvature of the image field at all points within the image field are derived, and the symbology elements recorded at each point are modified as a function of the correction factor to compensate for the distortion of the symbology element when imaged as a planar symbology image. The modified encodement can be visible to the human eye. However, the modified encodements disclosed in the preferred embodiments described below in reference to the drawings are invisible encodements to take advantage of the capability of recording a great deal of data over the entire image field that also bears a visible image without obscuring or degrading the visible image. But, it should be kept in mind that the same or similar methods and apparatus can be employed in accordance with the invention to record visible encodements on such curved objects and to read them with a simple reader, e.g., a planar imager.

The visible image on which the invisible encodement is printed in accordance with the above-incorporated patent applications is typically originally captured on photographic film using a conventional photographic camera. User input data, e.g., sound or text, or camera input data, e.g., exposure conditions, are generated and encoded for printing as the invisible encodement in the image field of a photographic print made from the film image. The encodement in the image field is produced by development of a photographic emulsion layer of the film or by printing it upon a photographic print made from a captured photographic image by inkjet printing, thermal dye transfer printing, or other printing method. Alternatively, a visible print image can be captured by a digital camera having the capability of capturing a scene image as image data and also recording such user input data and/or camera input data to be associated with a print made from the image data. In this case, the invisible encodement is produced by reading and encoding the user input data and/or camera input data into symbology and printing it upon a photographic print by inkjet printing, thermal dye transfer printing, or other printing method. The invisible encodement is read out by a simple, hand held planar imager that captures the invisible encodement, decodes it, and reproduces the data.

The present invention may be practiced using such techniques for photographic prints that are intended to be displayed with a curvature. But, the present invention is also intended to be practiced using similar techniques for recording and capturing the invisible image on other articles or objects having curved image fields. Several exemplary completely or partially curved image fields are depicted in the drawings and described as follows, but it will be understood that the invention may be implemented in any curved image field formed on any object or article.

The visible image is printed information that can be seen by the user, in the form of pictorial information, text or other alphanumeric information, or non-alphanumeric indicia. The nature, content, and manner of production of the visible image is not critical to the present invention. In currently preferred embodiments, the visible image is printed in the image field on a surface of an object that is curved at least in part either inherently or when viewed, using mass production techniques.

The invisible encodement is preferably recorded or printed as an invisible layer of symbology elements that can be made visible to the planar imager by illumination of the invisible layer with radiation in a band outside the visible spectrum, wherein the radiation is modulated by the symbology elements, e.g., by absorption, reflection, transmission, or luminance. The frequency range or ranges of the invisible radiation modulated by the symbology elements is dependent upon the characteristics of the material used for the invisible encodement. Depending upon the material, infrared radiation or ultraviolet radiation, or both, can be used.

Suitable invisible dyes for imprinting SYMBOLOGY ELEMENTS in the image field of a print are described in above-referenced U.S. patent application Ser. No. 09/223, 859, incorporated herein by reference and in above-incorporated U.S. patent application Ser. No 08/931,575. Such invisible dyes can be read by illuminating the image field with invisible electromagnetic radiation that causes the dye to fluoresce. The fluorescent emission of the symbology recorded as the encodement within the image field is imaged as a planar symbology image upon a planar imager that is sensitive to the emission as described in the above-referenced U.S. patent application Ser. No. 09/128,881 which is hereby incorporated herein by reference.

Preferably, however, the invisible dye used to imprint the invisible symbology elements is an infrared absorbing dye. The encodement may be imprinted by thermal printing or inkjet printing based on a thermal dye transfer process utilizing any well known dye having significant spectral absorption in the infrared region and virtually none in the visible spectrum. Or, the imprinting may be accomplished by means of special photographic print paper having an infrared absorbing layer exposed with the two dimensional encoded array before, during or after the image printing process.

In order to read the variable data, the image field is illuminated with infrared radiation. The infrared radiation is absorbed by the imprinted symbology elements and reflected back from the media in the image field that is exposed between symbology elements. In this way, the encodement can be captured by an infrared sensitive image scanner or planar array, and the symbology can then be decoded.

The present invention contemplates capture of the invisible (and optionally the capture of the visible image as well) within the image field by disposing a planar imager, E.G., a two-dimensional CCD or CMOS array in alignment with the image field so that the image field is focused on the planar imager. The alignment can be achieved in a variety of ways, e.g., in the manner described in the above-referenced U.S. patent application Ser. Nos. 09/122,502 and 09/121,907.

Moreover, the following description illustrates the principles of the invention in relation to the recording or printing of a relatively simple bar code symbology as the invisible variable data encodement within the image field on a surface of the object. The present invention contemplates use of more sophisticated, two-dimensional symbologies using symbology elements that have been developed or will be developed for maximizing the amount of data, e.g., user input data or camera input data or data printed by other entities on objects that can be encoded within the image field and any other available surface of the object that can be imaged by a planar imager while imaging the visible image in the image field. Bar code symbols are formed from bars or elements that are typically rectangular in shape with a variety of possible widths. The specific arrangement of elements defines the character represented according to a set of rules and definitions specified by the code or symbology used. The relative widths of the bars and the spaces between the adjacent bars is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist including UPC/EAN, Code 39, Code 49, Code 128, Codabar, Interleaved 2 of 5, and PDF 417 used by Symbol Technologies, Inc., of Holtsville, N.Y. Or the encodement scheme marketed as "PaperDisk" by Cobblestone Software, Inc., of Lexington, Mass. may be employed.

It will also be understood that the present invention can be employed to record and read invisible encodements that are printed in an image field on an object that is devoid of any visible image. In this instance, it is desirable to provide indicia or other visible reference points signifying the location or boundaries of the invisible encodement so that it can be captured.

Figure 3:
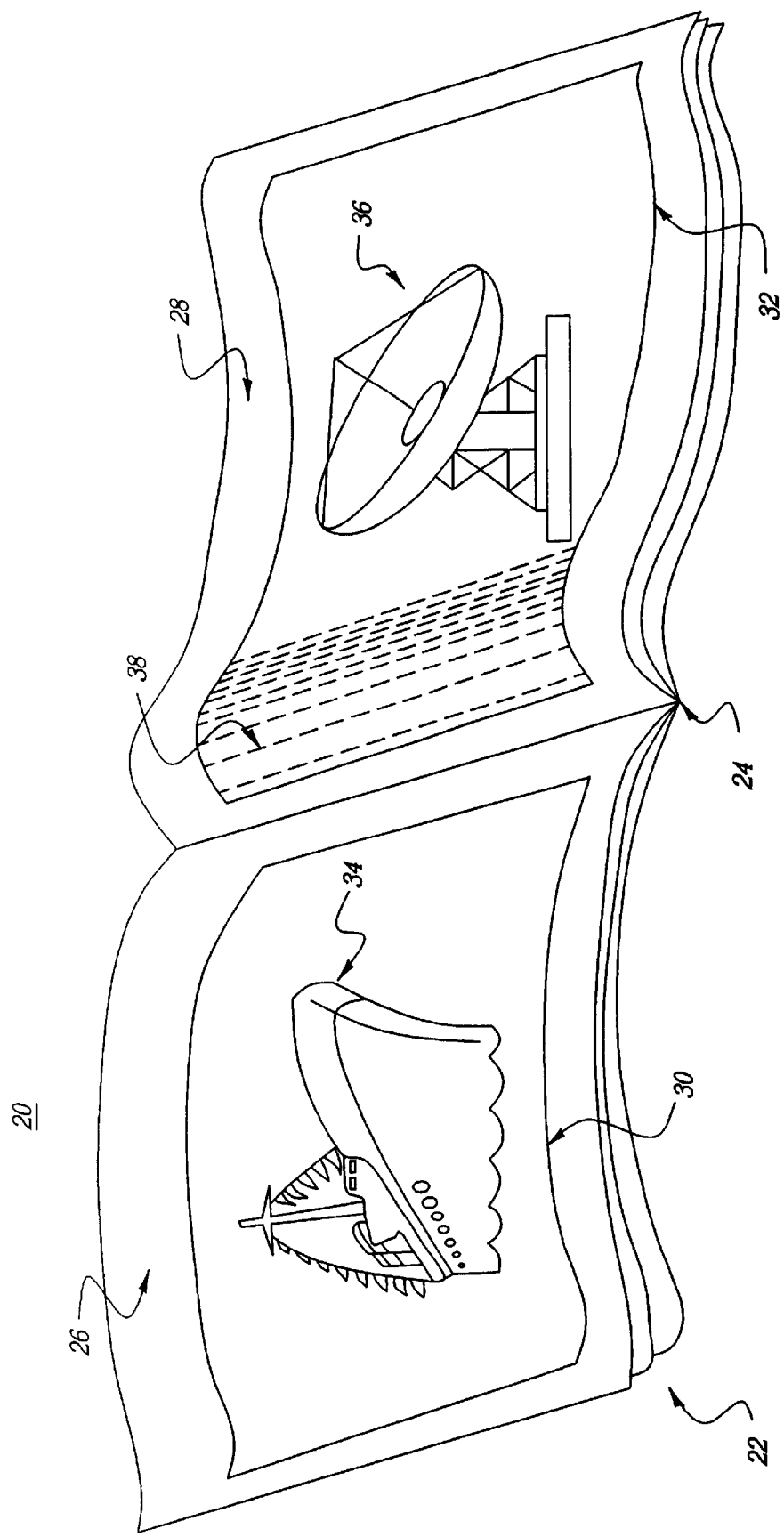
FIG. 3 is a perspective schematic view of a magazine or book opened to expose pages that bear visible images and invisible encodements recording sound information in accordance with a further embodiment of the invention.
Figure 5:
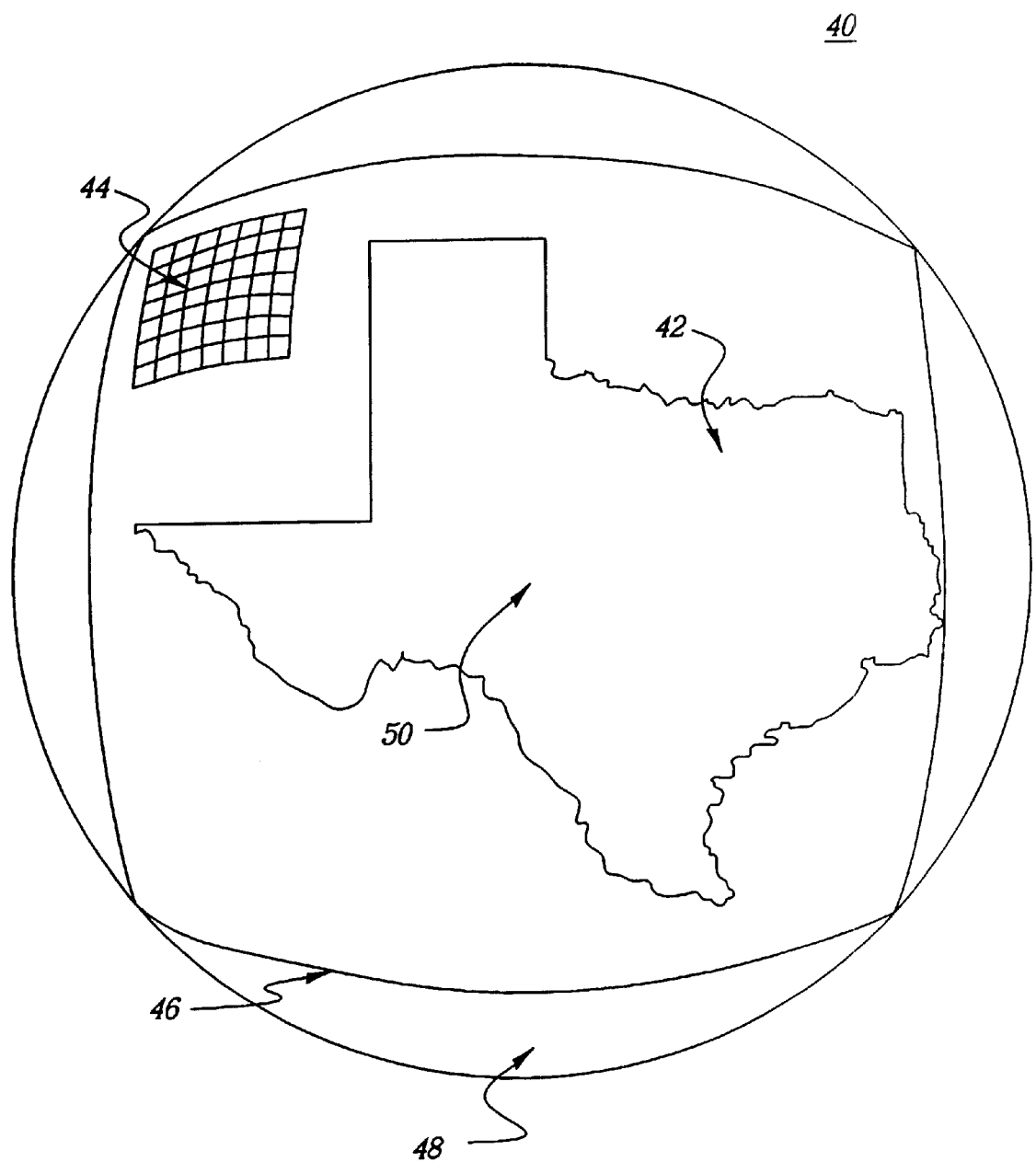
FIG. 5 is a side elevation, schematic view of a spherical object, e.g., a basketball, that bears a visible image and invisible encodement recording sound information on its spherical outer surface in accordance with a still further embodiment of the invention.

With this background information in mind, attention is directed to the exemplary embodiments of the invention depicted in FIGS. 1, 3 and 5. In each case, the image field is generally rectangular or square, but it may take any shape. In each case, an image field is depicted that is curved at least in part and contains both a visible image (or visible image) and an invisible encodement (or invisible encodement). In each case, the invisible encodement of symbology of one of the above-described types is only shown schematically and in part to avoid obscuring the depiction of the visible image. The image field may be defined by the visible image borders or may extend outwardly of the visible image borders and its boundaries may be marked by visible reference points or border lines. The invisible encodement may be coextensive with the image field or may occupy less area than the entire available image field. In any case, the visible image borders or the visible reference points or border lines enable the user of a planar imager to align it to the image field to capture it.

FIG. 1 is a side elevation, schematic view of a cylindrical object 10, e.g., a coffee mug or food or beverage container, that bears a visible image 12 and invisible encodement 14 of symbology of one of the above-described types. The encodement 14 records sound information or image information or other data to be read and reproduced within an image field 16 on its cylindrical, outer surface 18 of the cylindrical side wall in accordance with one embodiment of the invention. In this example, it will be assumed that encodement 14 is co-extensive with the visible image field 16. The image field 16 is viewed along an image axis (image axis 56 shown in FIG. 2) extending from a center point 50 of the image field 16 that is normal to a tangent of the side wall. The image field 16 can be considered to comprise right and left half image fields that are each curved away from the center point 50 toward the right and left side edges of the image field 16.

The image field 16 containing the visible image 12 and the invisible encodement 14 can be pre-printed on planar media in a printer as described below and transferred to the outer surface 18 in a manner well known in the art. Alternatively, the image field 16 containing the visible image 12 and the invisible encodement 14 can be directly printed upon the curved outer surface 18 or on a curved media having a curvature corresponding to that of the curved surface.

Figure 2:
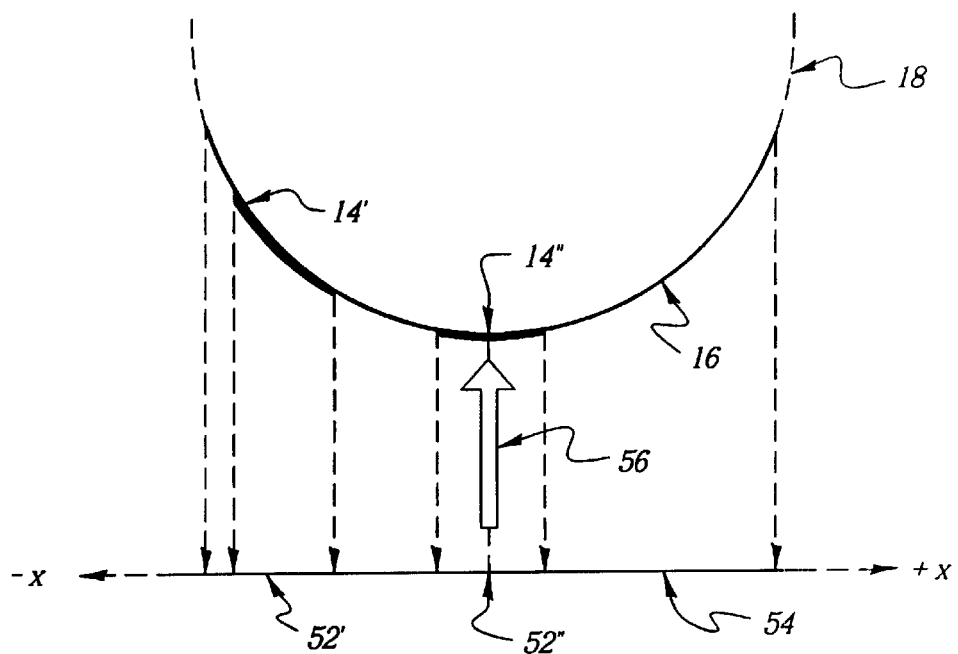
FIG. 2 is a schematic, cross-section view of the curvature of an image field on the cylindrical outer surface of FIG. 1 illustrating the distortion of symbology elements in the curved portions thereof when the encodement is imaged at a point along a line normal to the central point of the image plane.

FIG. 2 is a schematic, cross-section view of the curvature of the image field 16 on the cylindrical outer surface 18 of FIG. 1 and its projection onto or imaging in an image plane 54. FIG. 2 illustrates how the symbology in the illustrated peripheral encodement portion 14' is more distorted in width than is the symbology image 52' of the centrally disposed encodement portion 14" when they are projected onto or viewed as planar symbology images 52' and 52" in image plane 54. The image plane 54 is disposed at a distance from the outer surface 18 and perpendicularly to the image axis 56 extending from the center point 50 (also shown in FIG. 1) of the image field 16 normal to a tangent of the outer surface 18. The actual width (in the x-axis direction of curvature of the image field 16) of the depicted encodement portion 14' that appears on the outer surface 18 is greater than the width of the corresponding symbology image portion 52' as viewed or projected in the image plane 54.

Assuming that optical focus of symbology elements is maintained by an adequate depth of field, the true spacing between symbology elements and the true widths of the more distant symbology elements of symbology portion 14' are distorted by making them appear to be smaller than they actually are in symbology image portion 52'. In this case of a cylindrical image field 16, these element and spacing distortions increase as a function of the degree of curvature and the distance in the +x or −x direction from the center line 58 drawn in the y direction through the center point 50. This distortion occurs in both right (+x direction) and left (−x direction) half image fields in the case of two-dimensional curvature of the image field as illustrated in FIG. 1.

The depicted encodement portion 14" bridging the centerline for a certain distance in the +x and −x directions is printed employing symbology elements having element widths and spacings that comply with a particular symbology. These element widths and spacings are essentially undistorted when viewed or projected as the symbology image portion 52". But, the actual widths of the symbology elements and spacings between such symbology elements employed in the more curved encodement portion 14', for example, are adjusted to compensate for the curvature of the image field 16 that it appears in. This adjustment provides that the projected symbology elements and spacings of encodement portion 14' are normalized to those in the encodement portion 14". This adjustment is a function of the distance −x and +x from the center line and the curvature of the image field 16.

FIG. 3 is a perspective schematic view of a magazine or book 20 having a plurality of bound sheets 22 each bound along one side edge at a spine 24 and opened to expose pages 26 and 28 and image fields 30 and 32, respectively. Exposed pages 26 and 28 bear visible images 34 and 36 within image fields 30 and 32, respectively. An invisible encodement 38 of symbology recording data, e. g., visual or information or sound information or other data that is to be reproduced in accordance with a further embodiment of the invention is depicted within and occupying all or part of image field 32 of page 28. A similar encodement can be present in the image field 30 of page 26. The image fields of all of the magazine pages may be printed and bound in a manner well known in the art but with invisible encodements also printed in each image field.

Figure 4A:
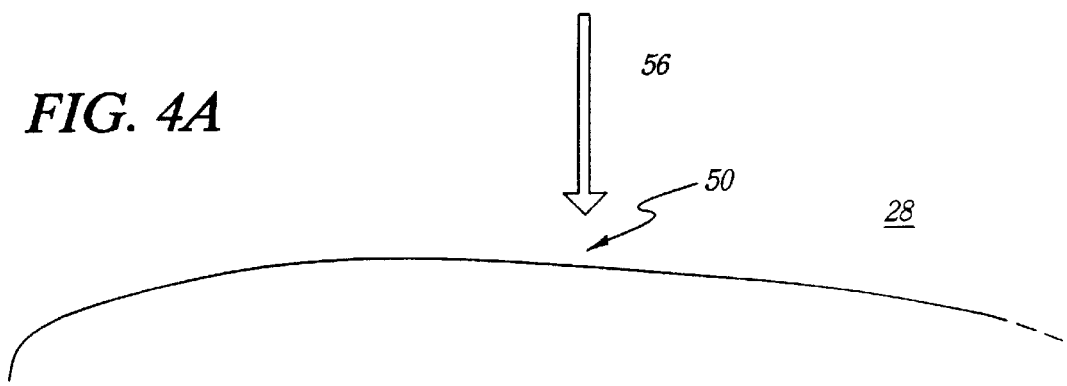
FIGS. 4a–4d illustrate the modification of a simple form of symbology within curved portions of an image field of a magazine or book page as shown in FIG. 3, for example.

FIGS. 4a–4d illustrate the modification of a simple form of symbology within curved portions of an image field of a magazine or book page as shown in FIG. 3, for example. In FIG. 4a, the cross-section view of the curvature of the exposed page 28 is shown in relation to the image axis 56. For purposes of illustration, it will be assumed that the encodement symbology in the image field is intended to be read as a series of bars of uniform height and thickness or width having a uniform spacing between each bar. If such a uniform bar code pattern is printed on the page 28 while it is flat, the curvature that the page assumes when the book or magazine is opened to that page will distort the pattern when it is viewed from a distance along image axis 56 or projected to a planar imager centered on the image axis 56.

Figure 4B:

FIG. 4b illustrates the distortion in apparent spacing and widths of the symbology elements or bars of the projected or viewed, uncompensated bar code 62 that is projected or viewed by suitable optics on an image plane of a planar imager. The planar imager (not shown) is assumed to be located normal to the image axis 56 and at a distance from the center point 60 of the image field sufficient to image the entire image field (as shown in FIG. 5). Thus, the apparent variation of bar spacing and width of the uncompensated bar code 62 may lead to failure to read the variable data or errors in the data that is read.

Figure 4C:
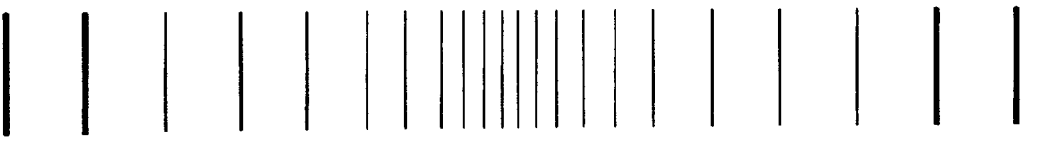

FIG. 4c depicts the pattern of the symbology elements or bars of compensated bar code 64 that are printed onto the image field of page 28 while is held planar to compensate for the curvature of the page when it is exposed as depicted in FIGS. 3 and 4a. The compensation comprises selective adjustments in the spacing between and widths of certain of the bars of the compensated bar code 64. The adjustment or compensation that is made is dependent upon the curvature and the spacing from the counter point 60 of the image field. An image field curvature model or map is derived for the geometry of the exposed page 28 and is employed to provide the compensation factors that adjust the width and spacing of each symbology element or bar of the compensated bar code 64.

Figure 4D:

FIG. 4d illustrates the resulting projection of the symbology elements or bars of the compensated bar code 64 of FIG. 4c onto the image plane resulting in the compensated bar code image 66. The printed symbology elements or bars of the compensated bar code 64 depicted in FIG. 4c are all optically projected onto or viewed from the image plane of the planar imager with uniform width and spacing. It will be understood that the adjustment of the printed bars can be accomplished for any desired pattern of bar widths and spacings that are desired to be projected into or viewed from the image plane of the planar imager. Moreover, the adjustment can be accomplished for other one dimension and two dimension symbologies that are known or are devised.

FIG. 5 is a side elevation, schematic view of a spherical object 40, e.g., a basketball, that bears a visible image 42 and invisible encodement 44 recording data within an image field 46 on its spherical outer surface 48 in accordance with a further embodiment of the invention. The spherical object 40 is viewed along an image axis extending from a center point 50 of the image field 46 and normal to a tangent of the spherical outer surface 48, whereby the image field 46 curves away from the center point 50 in all directions.

The image field 46 may be pre-printed on planar media in a printer as described below with the visible image 42 and the invisible encodement and transferred to the outer surface 48 in a manner well known in the art. Alternatively, the image field 46 containing the visible image 42 and the invisible encodement 44 can be directly printed upon the spherical outer surface 48 or on a curved media having a curvature corresponding to that of the spherical outer surface 48.

In the case of a spherical outer surface 48 or any other three dimensional surface that curves in two directions away from the image axis, the boundaries of the image field 46 can be straight or curved so that the image field 46 appears curved or straight when viewed or imaged from a point along the image axis normal to its center point 50. In FIG. 4, the side and top and bottom edges of the image field 46 appear to be convexly bowed outwardly from each corner. Such a convex curvature of the edges can occur when the image field 46 is produced on approximately square media and transferred to the spherical outer surface 48 or is directly printed on the spherical outer surface 48. This apparent shape of the edge 50 can appear to be more square or even concave or have any other shape by suitable shaping of the media prior to its application to the spherical outer surface 48. The manner in which it is shaped will not solve the distortion of the invisible symbology elements introduced by the curvature in two directions.

Thus, FIGS. 1, 3 and 5 depict exemplary objects bear two-dimensional image fields that are not planar and curve in the depth dimension in which the present invention can be implemented. The actual curvature of the image field is in the depth direction normal to the perceived or projected image field and may be away from or toward the point of view of one viewing the image plane along the image axis. The image field may still appear to be rectangular or square when viewed or imaged from a point along the image axis normal to the image field at its center point. However, the symbology elements in the curved portions of the image field bending away from the view point will be distorted when viewed from this point, and they may not be properly decoded when the symbology is captured from a point along a line normal to the center of the image array unless compensation is introduced as described in reference to FIGS. 2 and 4a–4d.

Figure 6:
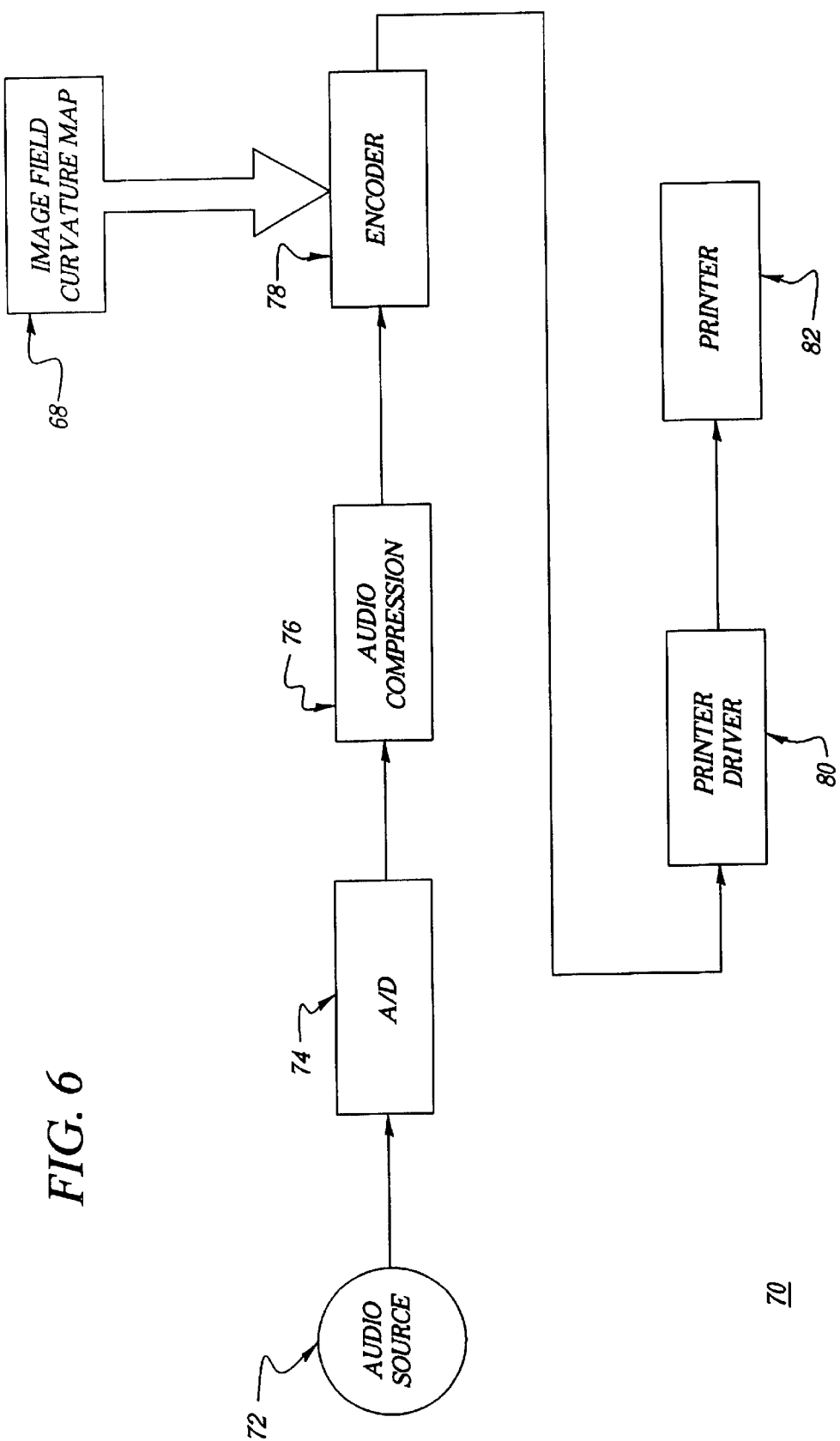
FIG. 6 illustrates structure and functional blocks of a system for recording invisible symbology in a curved image field of the types illustrated in FIGS. 1, 3 and 5, for example, with modification of the symbology within at least portions of the image field to compensate for curvature of those portions of the image field.
Figure 7:
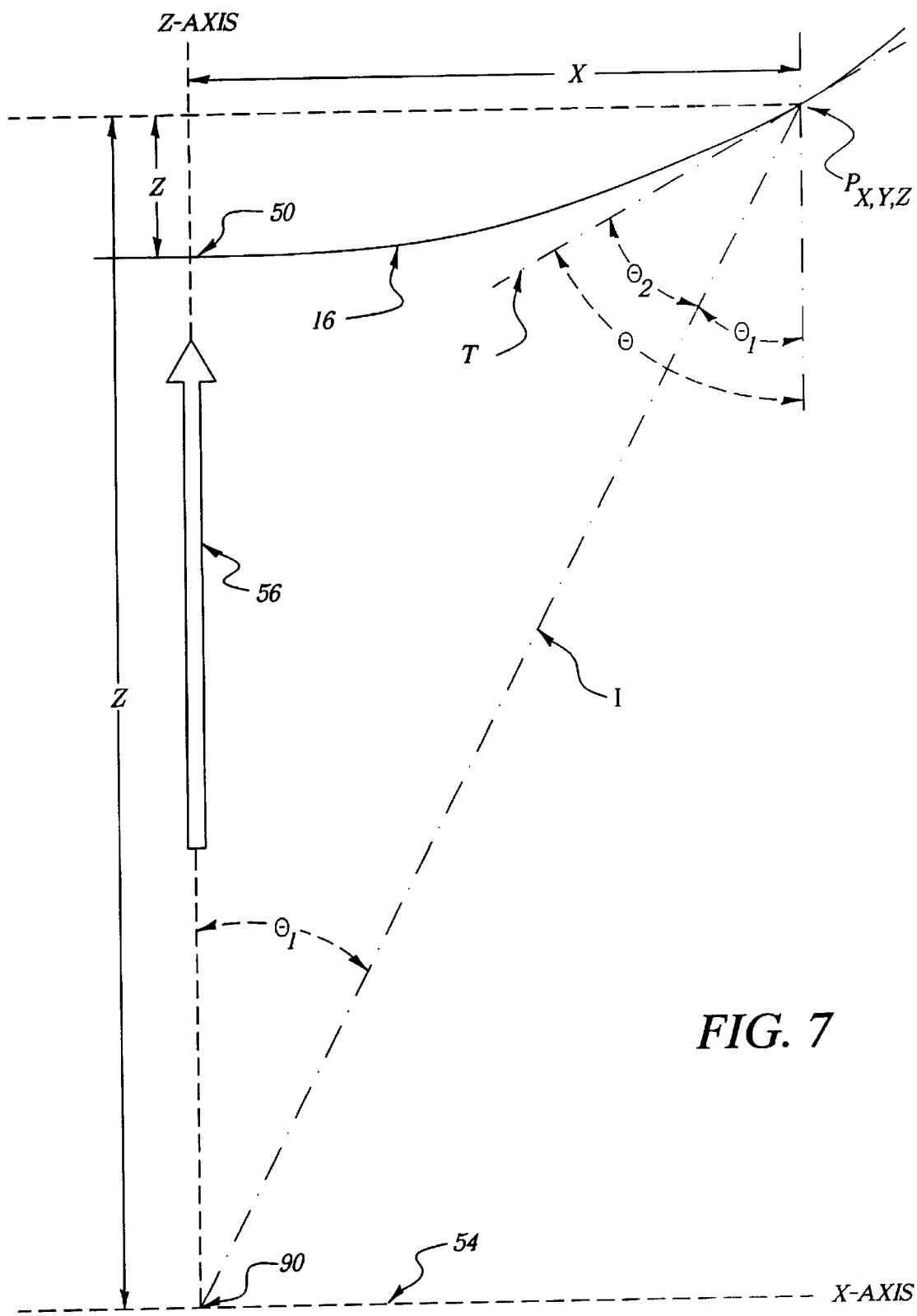
FIGS. 7 and 8 schematically illustrate a method of deriving modification factors for each point of a curved image field to derive an image field curvature map that is employed in the recording system of FIG. 6 in adjusting symbology element dimensions and spacings between symbology elements at each such point.

Attention is next directed to the recording system 70 of FIG. 6 for recording invisible symbology in a curved image field of the types illustrated in FIGS. 1, 3 and 5, for example, with modification of the symbology recorded within at least portions of the image field to compensate for curvature of those portions of the image field. FIG. 7 illustrates the principles of deriving an image field curvature map that is used in the encoding of the compensated symbology, e.g., the compensated bar code 64 of FIG. 4c. The recording system 70 can also be employed to record visible encodements in such curved image fields.

The recording system 70 is generically illustrative of the steps of recording and the equipment that can be used to transform audio information into the encoded data of the encodement, compensated for the curvature of the image field the encodement is to be printed on, and for using the encoded data to print the invisible encodement in the curved image field of any of the types described above and on any object or media. The recording system 70 may constitute a single user system that might be implemented using a stand alone machine or a personal computer that processes audio information and prints it on media or any curved surface, usually only once. Or, it may constitute a high volume commercial user system that derives the encodement data from, high volume printer for making multiple copies of the same object bearing the invisible encodement, e.g., magazine or book pages to be bound in further conventional binding operations.

In any of these contexts, an audio information source 72 provides audio information to be encoded and printed as the invisible encodement image in an image field. The audio information source may constitute a pre-recorded audio recording or an audio recording that is generated by the user in preparation for printing audio recording information. The audio information 72 is expected to relate to a visible image in the image field on media or any other article or object that is already printed or is to be printed. If the audio signal provided by the audio source 72 is in analog form, it is applied to an A/D converter 74 for conversion to digital form. The A/D converter 74 is bypassed if the audio source 72 is already in digital form. The digital audio data is then applied to an audio compression module 76 which includes an algorithm which reduces the amount of digital data required to represent the audio signal. An example of a suitable audio compression module is Digital Voice Systems, Inc., AMBE-1000 Voice Coder. The compressed audio data is then applied to an encoding module 78 where the data is encoded into a two dimensional data array utilizing, for example, the known format of ANSI Standard PDF 417. Software and hardware for encoding and rendering the data according to this standard is obtainable from Symbol Technologies, Inc. as a part of an LS 4904 2D Scanner System. Another example is an encodement known as "Datastrip" available from Datastrip Corporation and the above-referenced "PaperDisk" encodement available from Cobblestone Software, Inc. The encoded data array is rendered into a printable format to print the invisible encodement by means of printer driver module 80 which formats the encoded data in known manner into a format appropriate for utilization by printer 82.

Printer 82 may be a thermal dye transfer printer, inkjet printer, electro-photographic printer or the like adapted for printing any of the curved media or objects described above directly onto the image field. Alternatively, printer 82 may comprise a high volume magazine or book page printer or curved media or object printer. In either case, the visible image may be already printed in the image field, or it may be simultaneously printed. As noted above, the recording system 70 can also be employed to print the invisible encodement in an image field that does not include a visible image, and the visible image boundaries and the invisible encodement are not necessarily co-extensive.

Figure 8:
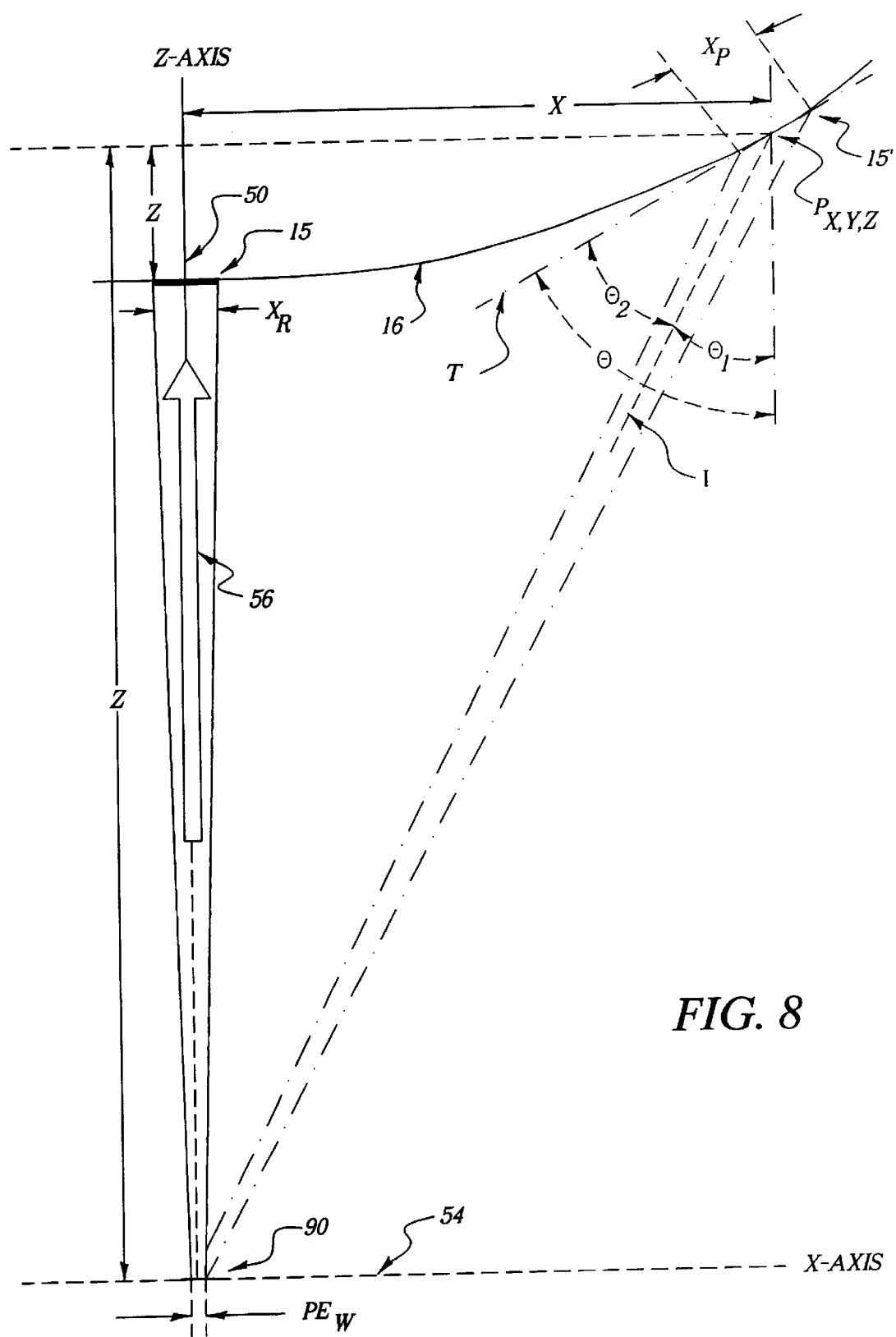

The encoder 78 also employs an image field curvature model or map 68 that is two-dimensional and provides adjustment or correction factors for each spatial location of the curved image field that are used to adjust the symbology of the encodement to transform the encodement in the manner illustrated in FIGS. 4a–4d and described above. FIGS. 7 and 8 schematically illustrate in an exaggerated manner a simplified method of deriving modification or correction factors based on the geometry of the curvature from which an image field curvature map 68 can be derived.

In FIGS. 7 and 8, it is assumed that the curved image field 16 (or 32 or 46) curves away from the image plane 54 upon which a planar symbology image on the curved image field 16 facing the image plane 54 is imaged by suitable optics. The size of the planar symbology image within the image plane 54 is adjusted by the optical system (not shown) so that it falls within the height and width dimensions of the two-dimensional planar imager located in the image plane 54. In FIG. 7, the image plane 54 and the curved image field are viewed in cross-section from the top or Y-axis direction. So, the image plane 54 is assumed to fall in the plane defined by the X-axis direction and the Y-axis direction, and the optical axis 56 extends in the Z-axis direction. The distance from the image plane 54 along the optical axis 56 to the center point 50 of the image field 16 is dictated by the dimensions of the image field 16, the planar imager in image plane 54, and the optics used to project the entire image field onto the planar imager 90.

Correction factors for each point on the surface of the curved image field 16 are derived and employed as the image field curvature map. For this purpose, the planar imager 90 can be presumed to be a point source because the width (x) and height (y) dimensions of the each pixel of the planar imager 90 are orders of magnitude smaller than the width and height dimensions of the curved image field 16. Moreover, the optical system dictates that the planar imager be located at a distance of one to two feet, for example, from the image field 16 to image or project it upon the planar imager 90. The exaggerated view of FIG. 8 does illustrate a pixel element width in the X-axis direction dimension.

Each point of the image field 16 can be identified by a x,y,z coordinates position in relation to the center point 50. The curvature in the Z-axis direction would be known from the surface that the image field is placed upon (e.g. from the radius of the cylindrical outer surface 18 of FIG. 1), Thus, each x, y point in the curved image field 16 is also defined by a distance in the z-axis direction of the optical axis 56. It is therefore possible to derive a correction factor for each such image field point that can be used to adjust a symbology element dimension or a space between adjacent symbology elements so that they are optically corrected as described above with respect to FIGS. 2 and 4a–4d when projected into the image plane 54.

The size of each symbology element and the spacing between adjacent symbology elements is also a great deal smaller than the dimensions of the image field 16 to achieve high density data storage. A correction factor that is normalized to unity as described below is derived for each point, e.g., point $P_{X,Y,Z}$; simply from the knowledge of the geometry of the image field at all x,y,z points and the distance along the optical axis from its center point that it will be viewed or imaged from.

The correction or adjustment factor W for each such point can be derived as illustrated for a relatively exaggerated sized point $P_{X,Y,Z}$ illustrated in FIG. 8. In FIG. 7, the angle θ is the known angle subtended by a tangent line T drawn tangent to point $P_{X,Y,Z}$ and the fixed Z-axis direction. The angle $\theta_1$ is the angle subtended by the optical line extending from a sensor element on the planar imager 90 to the point $P_{X,Y,Z}$ on the image field 16 and the optical axis 56 from the sensor element to the center point 50. the angle $\theta_2$ is the angle determined by the tangent line T drawn tangent to point $P_{X,Y,Z}$ and the image axis I between the sensor element of planar imager 90 and point $P_{X,Y,Z}$, and $\theta_2=\theta-\theta_1$.

The adjustment factor W to correct for curvature at any point, e.g. point $P_{X,Y,Z}$, is related to angle $\theta_2$ as follows:

$$W=1/\sin \theta_2 \qquad (1)$$

The angle $\theta_1$ can be derived mathematically from the position coordinates Z and X, using the formula:

$$\theta_1=\tan X/Z \qquad (2)$$

The position coordinate Z comprises the sum of the distance between the center point 50 and the image plane 54 and the z-axis displacement of point $P_{X,Y,Z}$ relative to center point 50.

Then, the adjustment factor W is derived from the formula:

$$W=1/\sin (\theta-\theta_1) \qquad (3)$$

The correction factor is normalized to the projected width of a symbology element viewed along the Z-axis direction point imaged by the planar imager 90 as shown in FIG. 8. In FIG. 8, a symbology element 15 at the center point 50 is imaged onto one or more sensor pixel elements of the planar imager 90 having pixel element(s) width $PE_W$. The width $W_R$ of the symbology element 15 in the X-axis direction as measured by the planar array 90 is a reference value that is also used to normalize the correction factor W. In order for a symbology element 15' at point $P_{X,Y,Z}$ to be decoded as equivalent to the reference value width of symbology element 15 (in the X-axis direction), then the width $W_P$ of symbology element 15' must be increased from the reference width $W_R$ of the symbology element 15 by the correction factor W when it is printed into the image field 16 at that point $P_{X,Y,Z}$. Thus, the width $W_P$ of symbology element 15' is increased by the formula:

$$W_P=W \cdot W_R \qquad (4)$$

If a spacing between symbology elements occupies the point, then the spacing is also adjusted in the same manner. A similar exercise can be undertaken for all points of the image field in both the illustrated X-axis direction and the Y-axis direction for compound image field curvatures as exemplified by the spherical object image field 46 of FIG. 5.

Figure 9:
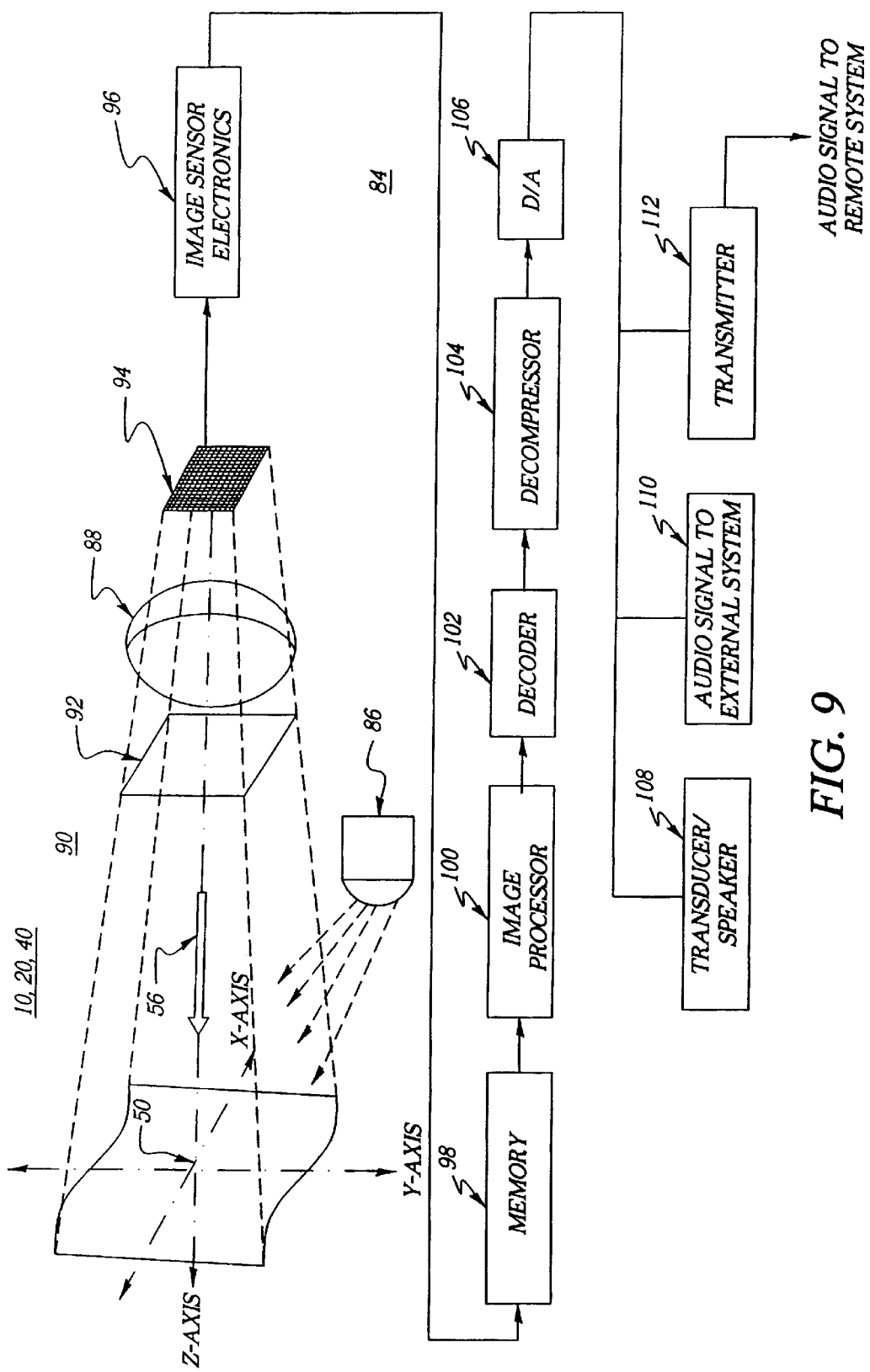
FIG. 9 illustrates structure and functional blocks of a system for capturing and decoding the symbology within the encodement and reproducing it as data or sound or visual information.

FIG. 9 illustrates structure and functional blocks of an encodement reader system 84 for capturing and decoding the symbology within the encodement printed on the curved image field of one of the above-described objects and reproducing it in a variety of ways, e.g., as sound. For example, the object depicted in FIG. 9 comprises the exposed page 28 of FIGS. 3 and 4a that is inherently curved. All of the blocks of the encodement reader system 84 can be incorporated into a hand held or frame mounted unit that the user can manipulate to generate the audio sound that is associated with the object and/or the visible image on the object. If the encodement comprises visible or printable information, then the encodement reader system 84 can include or output signals to a visual display or printer. Suitable encodement reader systems are described in the above-incorporated U.S. patent application Ser. Nos. 08/931,575 or 09/122,502 or 09/121,907.

The encodement in the image field on the page 28 is read or captured by a planar imager 90 comprising an auxiliary light source 86, an optical focusing system 88, a spectral bandpass filter 92, and a two-dimensional sensor array 94 having an image plane on which the planar symbology image is focused or projected. The sensor array 94 comprises a CCD or CMOS array that captures or "grabs" the illuminated encodement and provides an output signal to image sensor electronics 96. Image sensor electronics 96 converts the output of the sensor to a digital signal which is then stored in memory unit 98. The spectral bandpass filter 90 is of the type which is transparent to the wavelength of light modulated by the symbology of the invisible encodement and blocks other wavelengths of light reflected from the image field. The auxiliary light source 86 has spectral illumination characteristics which make the encodement visible to the image sensor 92. Preferably the encodement is recorded using infrared absorbing dyes as described above, and the auxiliary light source 86 emits infrared light that is absorbed by the symbology elements and reflected by the media in the spaces between symbology elements thereby providing an image of the encodement.

Image processor 100 retrieves the data from memory unit 98 and manages the order in which the data is decoded and decompressed in decoder 102 and decompressor 104. The operations performed in decoder 102 and decompressor 104 are essentially the inverse of the compression and encoding operation described in reference to FIG. 6, and are performed by the Digital Voice Systems or Symbol Technologies or PaperDisk software described above. The digital data output from decompressor 104 is converted to an analog signal by D/A converter 106 and applied to one or more output devices such as a speaker 108, or to remote transducer units via a cable 110 or transmitter 112.

The encodement reader system 84 is packaged into a hand held wand or is mounted in a fixture that also receives the object to be read. In use, the user holds the wand or adjusts the fixture so that a planar symbology image of the image field illuminated by auxiliary light source 86 is imaged onto the planar sensor array 94. Although not specifically shown in FIG. 8, it will be understood that the alignment can be maintained by additional elements disclosed in the above-incorporated U.S. patent application Ser. Nos. 09/122,502 and 09/121,907. Such elements include one or more marker projection source that emits one or more visible light beam that can be aligned with one or more visible fiducial or image field border printed on the object that marks the borders of the invisible encodement. The marker projection source includes one or more emitters that each project a bright light that is readily seen even in the presence of ordinary room lighting. Any bright light source can be used as an emitter, but it is currently preferred that the emitter be a coherent emitter, such as a laser diode, since current emitters produce bright, narrow beams with modest power consumption.

After the alignment with the invisible encodement is achieved in one of these manners, the user depresses a capture button to cause the auxiliary light source 86 to flash and the planar sensor array 94 to capture the planar symbology image that is projected upon it. In this manner, the invisible encodement is converted into sound or printed or visual information or into a data file that can be heard or seen by the user or otherwise used.

The invention has been described in detail with particular reference to certain preferred embodiments thereof, but it will be understood that variations and modifications can be effected within the spirit and scope of the invention.

What is claimed is:

1. An object bearing an image visible to the eye, said object further comprising:

an object surface bearing an image field in which the visible image is present, the object surface and image field thereon being non-planar and curved in at least one dimension; and an encodement in a symbology representing encoded information recorded in a material that is invisible to the eye and over a substantial portion of the visible image in the image field including curved encodement portions that are curved due to the curvature of the non-planar image field, the symbology of the encodement recorded within the image field adapted to be imaged as a planar symbology image upon a planar imager that is sensitive to the invisible material and is disposed in use generally at a predetermined distance from a central point of the two-dimensional visible image to capture the entirety of the encodement, wherein the symbology is modified to compensate for optical distortion of the symbology introduced by imaging the curved encodement portions as the planar symbology image to ensure that the symbology is accurately captured by the planar imager.

2. The object of claim 1, wherein:

the symbology comprises a pattern of marks that are invisible to the eye, each mark having a shape and each mark separated from an adjacent mark by a spacing between the marks whereby information is encoded in the shapes and/or the spacings between the marks; and modification of the symbology comprises modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

3. The object of claim 2, wherein the symbology comprises a one-dimensional bar code formed of bars arrayed in one dimension having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

4. The object of claim 2, wherein the symbology comprises a two-dimensional bar code formed of bars arrayed in two dimensions having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

5. The object of claim 1, wherein:

said object comprises a magazine or book comprising a plurality of two-dimensional pages bound together at a spine extending along a binding side of the pages, whereby the binding along the spine causes the pages to be curved convexly in a direction extending for a predetermined curvature distance laterally away from the binding side of the page when the magazine or book is opened to expose a page;

said surface of the object comprises at least a portion of a page bearing said two-dimensional visible image that is curved convexly in profile in an image curvature band extending laterally away from the binding side of the page when the magazine or book is opened to expose the visible image on the page; and the symbology recorded in the image curvature band is modified to compensate for distortion introduced by imaging the curved encodement portions as planar symbology image portions to ensure that the symbology is accurately captured by the planar imager and read, decoded and reproduced as aural and/or visual information.

6. The object of claim 5, wherein:

the symbology comprises a pattern of marks that are invisible to the eye, each mark having a shape and each mark separated from an adjacent mark by a spacing between the marks whereby information is encoded in the shapes and/or the spacings between the marks; and modification of the symbology comprises modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

7. The object of claim 6, wherein the symbology comprises a one-dimensional bar code formed of bars arrayed in one dimension having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

8. The object of claim 6, wherein the symbology comprises a two-dimensional bar code formed of bars arrayed in two dimensions having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

9. The object of claim 1, wherein:

said object comprises a cylindrical container having an axis and a side wall and a cylindrical exterior surface of the side wall that is convexly curved in a direction transverse to the axis;

said image field of said surface of the object comprises at least a portion of said cylindrical exterior surface bearing the two-dimensional visible image, whereby said two-dimensional visible image is curved convexly in profile when imaged along an image axis extending from a center point of said image field and normal to a tangent of the side wall, whereby said image field comprises first and second, half image fields that are each curved away from said center point; and the symbology recorded in the first and second half image fields is modified to compensate for distortion introduced by imaging the curved encodement portions as planar symbology image portions to ensure that the symbology is accurately captured by the planar imager and read, decoded and reproduced as aural and/or visual information.

10. The object of claim 9, wherein:

the symbology comprises a pattern of marks that are invisible to the eye, each mark having a shape and each mark separated from an adjacent mark by a spacing between the marks whereby information is encoded in the shapes and/or the spacings between the marks; and modification of the symbology comprises modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

11. The object of claim 10, wherein the symbology comprises a one-dimensional bar code formed of bars arrayed in one dimension having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

12. The object of claim 10, wherein the symbology comprises a two-dimensional bar code formed of bars arrayed in two dimensions having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

13. The object of claim 1, wherein:

said object comprises a sphere having a geometric center, a spherical side wall, and a spherical exterior surface of the side wall that is convexly curved in all directions away from a tangential plane at any point of the spherical exterior surface;

said image field of said surface of the object comprises at least a portion of said spherical exterior surface bearing the two-dimensional visible image, whereby said image field and said two-dimensional visible image are curved convexly in profile in all directions when imaged along an image axis extending from a center point of said image field and through said geometric center; and the symbology recorded in the image field is modified in all directions from said center point of said image field to compensate for distortion introduced by imaging the convexly curved encodement portions as planar symbology image portions to ensure that the symbology is accurately captured by the planar imager and read, decoded and reproduced as aural and/or visual information.

14. The object of claim 13, wherein:

the symbology comprises a pattern of marks that are invisible to the eye, each mark having a shape and each mark separated from an adjacent mark by a spacing between the marks whereby information is encoded in the shapes and/or the spacings between the marks; and modification of the symbology comprises modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

15. The object of claim 14, wherein the symbology comprises a one-dimensional bar code formed of bars arrayed in one dimension having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

16. The object of claim 14, wherein the symbology comprises a two-dimensional bar code formed of bars arrayed in two dimensions having encoded bar widths and/or spacings between bars in accordance with a bar code standard, and the modification comprises adjusting the bar code width and spacings between adjacent bar codes to compensate for distortions thereof introduced by the curvature when imaged as the planar symbology image.

17. A method of recording an encodement in an image field of a surface of an object that is curved in at least one dimension, in a symbology representing encoded information, wherein the symbology of the encodement recorded within the image field is adapted to be imaged as a planar symbology image upon a planar imager that is sensitive to the material and is disposed in use generally at a predetermined distance from the image field to capture the entirety of the encodement, the method comprising the steps of:

deriving a correction factor for the curvature of the image field at a point within the image field;

modifying symbology to be recorded at the point as a function of the correction factor to compensate for the distortion of the symbology when imaged as a planar symbology image; and recording the modified symbology at the point in the image field.

18. The method of claim 17, wherein the symbology comprises a pattern of marks that are invisible to the eye, each mark having a shape and each mark separated from an adjacent mark by a spacing between the marks whereby information is encoded in the shapes and/or the spacings between the marks; and the modifying step further comprises the step of:

modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

19. The method of claim 18, wherein the symbology comprises a one-dimensional bar code formed of bars arrayed in one dimension having encoded bar widths and/or spacings between bars in accordance with a bar code standard, and the modifying step further comprises the step of:

adjusting the bar code width and spacings between adjacent bar codes to compensate for distortions thereof introduced by the curvature when imaged as the planar symbology image.

20. The method of claim 18, wherein the symbology comprises a two-dimensional bar code formed of bars arrayed in two dimensions having encoded bar widths and/or spacings between bars in accordance with a bar code standard, and the modifying step further comprises the step of:

adjusting the bar code width and spacings between adjacent bar codes to compensate for distortions thereof introduced by the curvature when imaged as the planar symbology image.

21. The method of claim 17, wherein:

said object comprises a magazine or book comprising a plurality of two-dimensional pages bound together at a spine extending along a binding side of the pages, whereby the binding along the spine causes the pages to be curved convexly in a direction extending for a predetermined curvature distance laterally away from the binding side of the page when the magazine or book is opened to expose a page; and said surface of the object comprises at least a portion of a page bearing said two-dimensional visible image that is curved convexly in profile in an image curvature band extending laterally away from the binding side of the page when the magazine or book is opened to expose the visible image on the page; and the modifying step further comprises the step of:

modifying the symbology recorded in the image curvature band to compensate for distortion introduced by imaging the curved encodement portions as planar symbology image portions to ensure that the symbology is accurately captured by the planar imager and read, decoded and reproduced as aural and/or visual information.

22. The method of claim 17, wherein:

said object comprises a cylindrical container having an axis and a side wall and a cylindrical exterior surface of the side wall that is convexly curved in a direction transverse to the axis; and said image field of said surface of the object comprises at least a portion of said cylindrical exterior surface bearing the two-dimensional visible image, whereby said two-dimensional visible image is curved convexly in profile when imaged along an image axis extending from a center point of said image field and normal to a tangent of the side wall, whereby said image field comprises first and second, half image fields that are each curved away from said center point; and the modifying step further comprises the step of:

modifying the symbology in the encodement portions recorded in the first and second half image fields to compensate for distortion introduced by imaging the curved encodement portions as planar symbology image portions to ensure that the symbology is accurately captured by the planar imager and read, decoded and reproduced as aural and/or visual information.

23. The method of claim 17, wherein:

said object comprises a sphere having a geometric center, a spherical side wall, and a spherical exterior surface of the side wall that is convexly curved in all directions away from a tangential plane at any point of the spherical exterior surface; and said image field of said surface of the object comprises at least a portion of said spherical exterior surface bearing the two-dimensional visible image, whereby said image field and said two-dimensional visible image are curved convexly in profile in all directions when imaged along an image axis extending from a center point of said image field and through said geometric center; and the modifying step further comprises the step of:

modifying the symbology of the encodement recorded in the image field in all directions from said center point of said image field to compensate for distortion introduced by imaging the convexly curved encodement portions as planar symbology image portions to ensure that the symbology is accurately captured by the planar imager and read, decoded and reproduced as aural and/or visual information.

24. A method of recording an encodement in an image field of a surface of an object that is curved in at least one dimension, in a symbology representing encoded information, the method comprising the steps of:

deriving a correction factor for the curvature of the image field at a point within the image field;

modifying a symbology element recorded at the point as a function of the correction factor;

recording the modified symbology element at the point within the image field.

25. The method of claim 24, wherein the symbology comprises a pattern of marks that are invisible to the eye, each mark having a shape and each mark separated from an adjacent mark by a spacing between the marks whereby information is encoded in the shapes and/or the spacings between the marks; and the modifying step further comprises the step of:

modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

26. The method of claim 25, wherein the symbology comprises a one-dimensional bar code formed of bars arrayed in one dimension having encoded bar widths and/or spacings between bars in accordance with a bar code standard, and the modifying step further comprises the step of:

adjusting the bar code width and spacings between adjacent bar codes to compensate for distortions thereof introduced by the curvature when imaged as the planar symbology image.

27. The method of claim 25, wherein the symbology comprises a two-dimensional bar code formed of bars arrayed in two dimensions having encoded bar widths and/or spacings between bars in accordance with a bar code standard, and the modifying step further comprises the step of:

adjusting the bar code width and spacings between adjacent bar codes to compensate for distortions thereof introduced by the curvature when imaged as the planar symbology image.

28. The method of claim 24, wherein:

said object comprises a magazine or book comprising a plurality of two-dimensional pages bound together at a spine extending along a binding side of the pages, whereby the binding along the spine causes the pages to be curved convexly in a direction extending for a predetermined curvature distance laterally away from the binding side of the page when the magazine or book is opened to expose a page; and said surface of the object comprises at least a portion of a page bearing said two-dimensional visible image that is curved convexly in profile in an image curvature band extending laterally away from the binding side of the page when the magazine or book is opened to expose the visible image on the page; and the modifying step further comprises the step of:

modifying the symbology recorded in the image curvature band to compensate for distortion introduced by imaging the curved encodement portions as planar symbology image portions to ensure that the symbology is accurately captured by the planar imager and read, decoded and reproduced as aural and/or visual information.

29. The method of claim 24, wherein:

said object comprises a cylindrical container having an axis and a side wall and a cylindrical exterior surface of the side wall that is convexly curved in a direction transverse to the axis; and said image field of said surface of the object comprises at least a portion of said cylindrical exterior surface bearing the two-dimensional visible image, whereby said two-dimensional visible image is curved convexly in profile when imaged along an image axis extending from a center point of said image field and normal to a tangent of the side wall, whereby said image field comprises first and second, half image fields that are each curved away from said center point; and the modifying step further comprises the step of:

modifying the symbology in the encodement portions recorded in the first and second half image fields to compensate for distortion introduced by imaging the curved encodement portions as planar symbology image portions to ensure that the symbology is accurately captured by the planar imager and read, decoded and reproduced as aural and/or visual information.

30. The method of claim 24, wherein:

said object comprises a sphere having a geometric center, a spherical side wall, and a spherical exterior surface of the side wall that is convexly curved in all directions away from a tangential plane at any point of the spherical exterior surface; and said image field of said surface of the object comprises at least a portion of said spherical exterior surface bearing the two-dimensional visible image, whereby said image field and said two-dimensional visible image are curved convexly in profile in all directions when imaged along an image axis extending from a center point of said image field and through said geometric center; and the modifying step further comprises the step of:

modifying the symbology of the encodement recorded in the image field in all directions from said center point of said image field to compensate for distortion introduced by imaging the convexly curved encodement portions as planar symbology image portions to ensure that the symbology is accurately captured by the planar imager and read, decoded and reproduced as aural and/or visual information.

31. Apparatus for recording an encodement in an image field of a surface of an object that is curved at least in dimension in a symbology representing encoded information, wherein the symbology of the encodement recorded within the image field adapted to be imaged as a planar symbology image upon a planar imager and is disposed in use generally at a predetermined distance from the image field to capture the entirety of the encodement, the apparatus further comprising:

means for deriving a correction factor for the curvature of the image field at a point within the image field;

means for modifying the symbology element as a function of the correction factor to compensate for the distortion of the symbology element at the point within the image field when imaged as a planar symbology image;

means for recording the modified symbology element at the point within the image field.

32. The apparatus of claim 31, wherein the symbology comprises a pattern of marks that are invisible to the eye, each mark having a shape and each mark separated from an adjacent mark by a spacing between the marks whereby information is encoded in the shapes and/or the spacings between the marks.

33. The apparatus of claim 31, wherein the symbology comprises a pattern of marks that are visible to the eye, each mark having a shape and each mark separated from an adjacent mark by a spacing between the marks whereby information is encoded in the shapes and/or the spacings between the marks.

34. The apparatus of claim 31 wherein and the modifying means further comprises:

means for modifying the pattern of marks and spacings between marks in the curved encodement portions as a function of the curvature of the curved encodement portions and said predetermined distance to compensate for distortion of the imaging of the curved encodement portions into a planar symbology image at said predetermined distance.

35. An object bearing an image visible to the eye, said object further comprising:

an object surface bearing an image field in which the visible image is present, the object surface and image field thereon being non-planar and curved in at least one dimension; and an encodement in a symbology representing encoded information recorded in a material that is invisible to the eye and over a substantial portion of the visible image in the image field including curved encodement portions that are curved due to the curvature of the non-planar image field, wherein the symbology is modified to compensate for optical distortion of the symbology introduced by imaging the curved encodement portions as a planar symbology.

* * * * *